Figure 1:
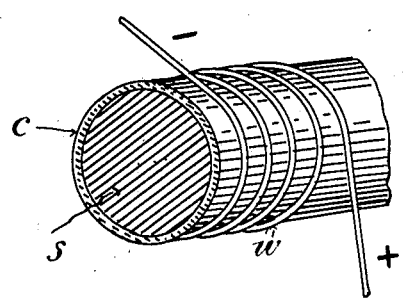

Feb. 4, 1930.    T. SATOW    1,745,768

METHOD OF FORMING A RAPIDLY VULCANIZING COMPOSITION

Filed Jan. 23, 1926

Inventor
Teikichi Satow
By his Attorneys
Darby & Darby

Patented Feb. 4, 1930

1,745,768

UNITED STATES PATENT OFFICE

TEIKICHI SATOW, OF TOKYO, JAPAN

METHOD OF FORMING A RAPIDLY VULCANIZING COMPOSITION

Application filed January 23, 1926. Serial No. 83,205.

This invention relates to an improved vulcanizing composition and method for producing said composition and has for its object the preparation of a rapid vulcanizable compound, which is vulcanized at atmospheric pressures and at low temperatures. Another object of my invention includes the provision of vulcanized products possessed of high heat insulation and high electrical insulation properties. A further object includes the provision of high tension insulation products which are for all practical purposes nonbreakable and equally suitable for high tension insulators or for gears and silent drives. My rapid vulcanized composition is further suited for insulation plates, for tools and for other purposes. I further provide an insulation paste suitable as a coating material for cloth, wood, iron and other substances. I also provide a vulcanized phenol condensation product and method set forth hereinafter. The new composition product is well adapted for many purposes, some of which are more fully described below.

I have discovered that if with the known vulcanizing rubber composition there is mixed a phenolic product or resin, preferably as a dry powder and this mixture thoroughly intermingled by kneading or otherwise to properly mix the ingredients which are then submitted to a low temperature of about 150° C, that there is formed in the course of from one to two hours a new rubber like phenolic condensation product. The heating step is applied at atmospheric pressure, and it is important that the heat be kept as low as may be consistent with success, as otherwise the phenolic compound will condense and harden permaturely. It is also important that no moisture be present in the compound when heated so as not to obtain a spongy mass due probably to the presence of water when the heating step is applied to the phenolic rubber composition at atmospheric pressures. In some cases I find it advantageous to mix with the phenolic resin and the rubber compound a suitable filler, as wood flour, asbestos and the like. These fillers must be likewise absolutely free from moisture in a finely pulverized state. If, however, a very small percentage of free moisture be introduced with the filler a translucent effect is produced in the finished product.

The following will serve as an example for preparing the phenolic rubber product, it being understood that the examples given for forming the phenolic compositions in combination with the rubber composition are for the purpose of illustration merely. The phenolic resin herein named as an ingredient may be obtained by heating a phenol with an aldehyde in the presence of a catalyst either with or without an organic combination compound.

As an illustration, I take for example 100 parts, by weight, of the selected fusible phenolic resin and combine therewith approximately 70 parts of wood flour, or its equivalent and 40 parts of asbestos, or its equivalent, and then mix the ingredients thoroughly in the dry, pulverized state. This mixture constitutes the phenolic composition and will be known herein as the phenolic component.

For the vulcanizable component, I take 100 parts by weight of rubber and thoroughly mix with this 50 parts of sulphur, 100 parts of magnesium carbonate and 20 parts magnesium oxide. These elements are thoroughly mixed and then rolled into sheets for further use.

I then combine equal parts of the phenolic composition with the vulcanizable component above described and mix the same thoroughly. This preparation is then rolled into sheets and heated at a temperature of about 150° C. in the open, that is at normal atmospheric pressure until vulcanization and phenolic condensation are complete. This step is satisfactorily carried out in an open paraffin bath at about 150° C. in about two hours or less. While I have given as a specific example equal parts of the phenolic and the rubber components it is understood that for certain purposes the proportions may be varied so as to increase or decrease the respective basic components and to thereby produce a modified form of final product in accordance with my specific requirements and wherein the characteristics of one or the other of the components predominate.

If the product thus obtained is to be used as a coating or as a non-breakable high tension insulating element, the said product is preferably dissolved in a solvent, as benzine to form a pasty mass or coating. This pasty mass is then applied as a coating under various conditions. If, for example insulating tubes are desired, it is only necessary to coat suitable strips of cloth, paper or fibre which serve and will be known herein as a "carrier" and wind the strips so coated on a mandril of suitable diameter for hardening. The solvent will evaporate rapidly and a suitable heat treatment, or baking, for about thirty minutes at normal atmospheric pressure will produce the finished article, which in this case is an insulating tube. The coated cloth material described above is also most excellent for use as a permanent coating for iron surfaces which are exposed to weathering and to corrosive actions, as propeller shafts, ship bottoms, exposed metal or wood parts in chemical laboratories or in chemical plants or the like where the known coating materials fail to adequately protect. Where the coating material is thus employed on propeller shafts, for example, the shaft is wrapped with the coated cloth or equivalent material by wrapping the strip spirally about the shaft and curing it in place. This step is readily accomplished by wrapping over the coating layer, whether of cloth or other material, a conducting wire for applying electricity to effect the final curing, baking or condensation step, whereby an integral union between the coating material and the iron is formed by reason of the presence of the heated sulphur and iron. If the coating is to be applied to a plate or to an extended surface, the coating material is applied with the cloth or fiber, and an iron mold or conducting plate fastened there over to effect the final reaction. By "carrier" as herein used is meant the cloth, paper or fibre which is employed to convey or support the pasty mass of the rapidly vulcanizing phenolic composition when said pasty mass is utilized as a coating.

When the rapid vulcanizable phenol product is used as a basis for forming insulation articles, as high tension insulators, tools, receptacles, plates, gears, or the like, the articles are formed either of the impregnated cloth or fiber material and molded, or if they are formed of the material mixed with the pulverized or powdered wood asbestos, or clay materials and molded or otherwise shaped and curved or finished in an open paraffin bath at a temperature of 150° to 170° C. when at the end of one to one and one-half hours the reaction is complete. The articles may be retained in the molds for the final step to retain their shape and form.

In Fig. 1 of the drawing I have shown the rapidly vulcanizing phenolic composition of my invention as a thermionic coating for an iron surface. The construction shown represents a portion of a propeller shaft $s$ which is covered with the coating $c$, secured in position by suitable heating means, such as a coiled wire $w$ electrically heated.

Figure 2:
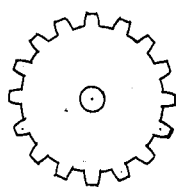

In Fig. 2 I have shown one form of insulation article produced by my composition.

Having now described my invention, what I claim as useful and new and desire to secure by Letters Patent is:—

1. That method of forming a rapidly vulcanizable coating material of phenolic composition which comprises heating at atmospheric pressure the herein specified rubber component with the specified phenolic compound, then treating the composition so formed with a solvent to form a semi-liquid, then combining the semi-liquid with a carrier and heating the liquid and carrier and cause the liquid to harden in place.

2. The method of making a rapidly vulcanizing coating material of phenolic rubber composition, which comprises heating together at a temperature below 170° centigrade substantially equal parts of a compound containing 100 parts of fusible phenolic resin and approximately 70 parts of wood flour and 40 of asbestos with a component containing approximately 100 parts of rubber, fifty parts of sulphur and 100 parts of magnesium carbonate, then dissolving said phenolic rubber composition to a semi-liquid, then saturating a fibrous material with said semi-liquid, then covering the surface to be coated with said saturated material and finally heating said material in place.

3. That method of coating iron with the herein described phenolic rubber composition which comprises impregnating a fibrous material with a solution containing fusible phenolic resin, a vulcanizable component and sulphur, then applying said impregnated fibrous material over the iron and heating said applied material to combine the coating material with the iron.

4. That method of coating a body with a rapidly vulcanizing phenolic composition, which comprises saturating a cloth with said rapidly vulcanizing phenolic composition, then applying said saturated cloth to the body to be coated so as to form a coating therefor and finally heating said coating at atmospheric pressure.

5. That method of coating an iron surface with a rapidly vulcanizing phenolic composition which comprises applying a coating of said rapidly vulcanizing phenolic composition to said surface, then covering said surface with a heat conductor and heating said covering at atmospheric pressure to harden the same.

In testimony whereof I have hereunto set my hand on this 7th day of January A. D., 1926.

TEIKICHI SATOW.